Figures 1, 2:
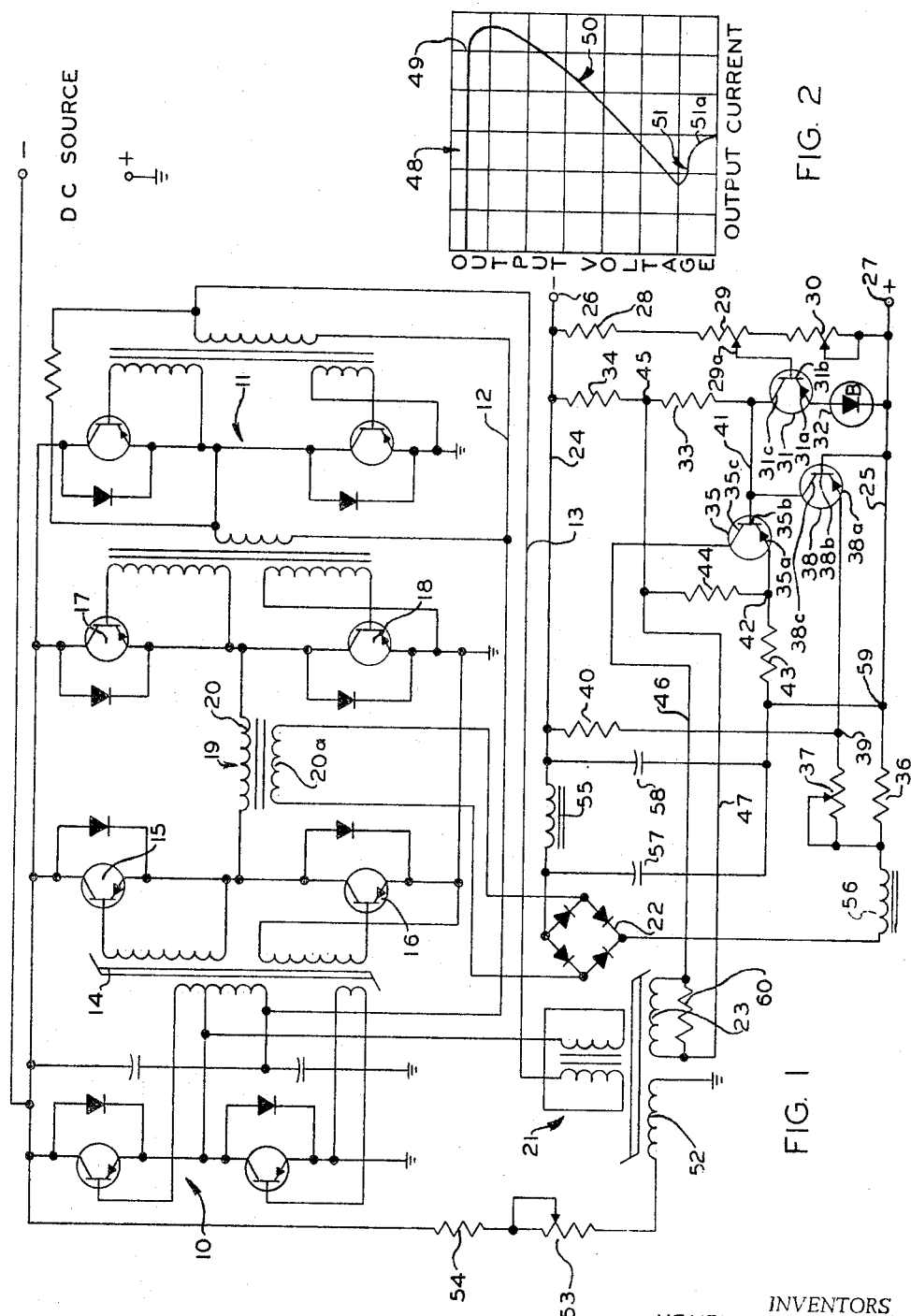

INVENTORS
HENRY M. HUGE
LOUIS R. SZABO
BY
ATTY.

united States Patent Office 3,283,238
Patented Nov. 1, 1966

3,283,238
REGULATOR CIRCUITRY
Henry M. Huge, Bay Village, and Louis R. Szabo, Avon Lake, Ohio, assignors to Lorain Products Corporation, a corporation of Ohio
Filed Aug. 3, 1962, Ser. No. 214,613
10 Claims. (Cl. 323—9)

This invention relates to a voltage regulating circuit for power supply equipment and the like for reliably maintaining a regulated output from the circuit with which it is associated.

An object of the invention is to provide an improved control circuit of the above character which is responsive to both change in input voltage and change in load current.

Another object of the invention is to provide a control circuit of the above character which is responsive to voltage and current changes wtih a minimum of delay and yet is simple in that a single electrical network is utilized for this purpose.

Still another object of the invention is to provide a regulating circuit which is responsive to changes in voltage and current and which, under short circuit conditions, reduces current flow to a safe limit but to a value of above zero so that a sensing condition is maintained, whereby, when the detrimental condition is removed, this fact will be detected and the unit will automatically return to normal operation.

Another object of the invention is to provide improved regulating circuitry of the above character whereby the output voltage of the device is closely regulated during normal load conditions in spite of input voltage variation and whereby output current is reduced with output voltage reduction, upon overload conditions, to a value sufficiently low so that components are not subjected to destructive current peaks.

More specifically it is an important object of the invention to accomplish the foregoing by comparing a voltage resulting from the magnitude of load current with a variable voltage which is proportional to output voltage as distinguished from those regulators in which the comparison voltage is fixed or constant. This feature of the invention is advantageous in that, by the use of a variable comparison voltage, the output being controlled will be reduced both as to voltage and current thereby avoiding the presence of intervals of detrimental or excessive peak current flow through the components in the circuit.

A still further object of the invention is to provide regulating circuitry which is well adapted for use with control circuitry of the type which controls the pulse width of a power signal such as that shown in the application of Lee O. Mesenhimer, Serial Number 214,591, assigned to the assignee of this application and filed August 3, 1962.

Under overload conditions, the output voltage of the device is reduced by narrowing the pulse width of the power signal. If under these conditions the output current is maintained constant while voltage is being reduced, the peak current increases with the result that damage to circuit components may occur. Accordingly, it is an object of this invention to limit the value of current pulse peaks under overload conditions, this being accomplished by circuitry which, upon attainment of overload conditions by the device, causes a reduction in output voltage and a simultaneous reduction in output current.

Another object of the invention is to provide regulating circuitry of the above character including variable conducting means which may be common to both voltage output responsive means and load current responsive means, together with control means governed by the variable conducting means and which is adapted to initiate a change in the pulse width of a power signal.

It is another object of the invention to provide, for a power supply, improved regulating circuitry which limits the inrush current upon starting thereby protecting circuit components against damage when the device is first turned on.

Still another object of the invention is to provide regulating circuitry for use with a transductor and control circuit of the type shown in the above mentioned Mesenhimer application and which varies the delay in passage of a signal through a transductor to regulate the output voltage and current, but which limits the delay of the signal therethrough to less than one half the cycle of the signal.

It is still a further object of the invention to provide regulating circuitry which produces variable, cooperating fluxes in a transductor to vary the time delay introduced into a circuit by said transductor.

Still another object of the invention is to provide regulating circuitry of the above character utilizing semiconductor devices.

Other objects and advantages of the invention will become apparent from the following description and accompanying drawings in which FIG. 1 is a schematic diagram of exemplary circuit embodying the invention and FIG. 2 is a voltage current curve of the output of a device utilizing the invention.

While the regulating characteristics of the present invention may be applied to a wide variety of controlled circuitry, there is shown herein, a pulse width modifying device which, as indicated previously, is embodied in the above mentioned Mesenhimer application and the details thereof are there fully described.

In general terms, the pulse width modifying circuit comprises oscillators 10 and 11, the output of oscillator 10 being connected to the oscillator 11 by means of leads 12 and 13, a transductor 21 being connected in the lead 13. The oscillator 10 which is provided with a saturable transformer 14, causes alternate and several energizing of transistors 15 and 16 coupling one side of a power bridge, while oscillator 11 causes alternate and several energizing of transistors 17 and 18 coupling the other side of the bridge.

To afford a power output from the bridge comprising transistor pairs 15 and 16 and 17 and 18, there is provided a transformer 19, the primary of which is connected across the bridge as shown. In general terms, as more fully explained in the Mesenhimer application, a signal is impressed upon the primary 20 and thus on the secondary 20a of transformer 19 during coincidence of conduction of either transistors 15 and 18 or transistors 16 and 17. The magnitude of this signal is determined by the length of the period of coincidence of conduction during each cycle.

Accordingly, it will be seen that when oscillators 10 and 11 are operating in phase with one another, the above mentioned period of coincidence of conduction will be the longest and thus, the strongest signal will be impressed on the primary winding 20 of the output transformer 19. On the other hand, if there is out of phase operation between oscillators 10 and 11, transistors 15 and 18 or 16 and 17 will likewise operate out of phase with the result that the period of coincidence of conduction is reduced to, in turn, reduce the magnitude of the signal impressed upon the transformer 19.

Thus if the phase relationship of the operation of oscillator 11 with respect to oscillator 10 can be varied, the result will be a variation of the output at the transformer 19, the rectifier 22 and output leads 24 and 25.

To the end that the above discussed phase relation may be controlled, there is incorporated in the leads 12 and 13 between the oscillators a transductor 21 as previously indicated. The transductor 21 provides a time delay which causes a lag in the operation of oscillator 11 with respect to oscillator 10. Since oscillator 10 drives transistors 15 and 16 alternately and severally directly through the transformer 14, it will be seen that the delay introduced into the operation of oscillator 11 will be reflected in the alternate and several operation of transistors 17 and 18. Thus in this manner, the coincidence of conduction between companion transistors 15 and 18 and companion transistors 16 and 17 is obtained to control the output.

It follows that if means is provided for varying the magnetic characteristics of the transductor 21 in a controlled manner to vary the delay introduced into the circuit, the output from the transformer 19 to a rectifier 22 may likewise be controlled proportionally to the variation in such magnetic characteristics.

As indicated in the aforementioned Mesenhimer application, there is provided a control winding 23, the current flow through which serves to provide the necessary control as described above and which is energized by a variable conducting means as will be described presently, the leads 46 and 47 serving as the connecting means between the variable conducting means 35 and the control means 23. It will also be seen that the control means 23 can take one of many forms in that it can be a controlling member as shown herein, a controlled member such as a meter or the like or any other electrically responsive device.

It is to the control of current flow through winding 23 in response to input and load conditions that the present invention is directed.

The alternating current output from the power transformer 19 is rectified at 22 and fed through leads 24 and 25 to D.-C. output terminals 26 and 27. Reference to the D.-C. source, as shown in the drawing, will reveal that for purposes of the present description, the invention is shown in conjunction with the circuit having positive ground.

To the end that any tendency of the output voltage across terminals 26 and 27 to charge is sensed, there is provided across these terminals a voltage divider including resistor 28, potentiometer 29 and variable resistor 30.

In order to amplify any slight change in voltage across the output terminals 26 and 27, thus providing an error signal, there is provided a transistor 31 having an emitter, base and collector electrodes 31a, 31b and 31c respectively. A constant potential is maintained on the emitter electrode of transistor 31 by means of a zener diode 32 connected between the emitter electrode 31a and the lead 25. To provide an output signal from transistor 31, a load resistor 33 is connected between the collector electrode 31c and the lead 24, and should the voltage rating of transistor 35 be less than the rated voltage of the power supply, a voltage dropping resistor 34 may be, in turn, connected to negative potential as shown. The conduction of transistor 31 is controlled by the potential applied to the base electrode 31b from the wiper arm 29a of potentiometer 29. Thus, should the voltage across terminals 26 and 27 increase, the base electrode 31b of transistor 31 will become more negative with respect to the emitter electrode which is at a fixed potential and the conduction of transistor 31 will increase. Due to this increase in conduction, the voltage on collector 31c with respect to the positive potential on lead 25 will become less negative thus reducing the conduction of variable conducting means comprising a transistor 35 having emitter, base and collector electrodes 35a, 35b, and 35c respectively. The latter action results from connecting the collector electrode 31c of transistor 31 to the base electrode 35b of transistor 35 by means of a lead 41. Similarly, if the output voltage between terminals 26 and 27 decreases, the emitter-collector conduction through transistor 31 will be reduced while emitter-collector conduction through a transistor 35 will increase. In the interest of simplicity and responsiveness, the present invention contemplates the variable conducting element 35 as common to both output voltage changes and load current changes. Thus the combined effects of both output voltage and load current are impressed thereon.

As explained previously, the time delay of the transductor 21 is determined by the current flow in control winding 23 as supplied from transistor 35. Therefore, if transistor 35 is conducting heavily through emitter-collector due to output terminal conditions, the time delay of transductor will be short, allowing the oscillators 10 and 11 to operate nearly in phase to thereby produce wide power pulses in the power transformer 19. On the other hand, if transistor 35 shuts off and current flow through the control winding 23 ceases, the operation of oscillator 11 will lag that of oscillator 10 by nearly one-half cycle thus producing very narrow pulses in the power transformer 19. In this latter case, minimum output is obtained from the device. Hence it will be seen that variation in current flow through the control winding 23 due to variation in the conduction of transistor 35 will vary the pulse width of the output of power transformer 19 to maintain voltage constant for varying loads which are within the rated output capacity of the power supply. Under overload conditions, as will be explained presently, the pulse width is made narrow to reduce the output of power transformer 19.

As indicated previously, with respect to maintaining a constant output of electrical equipment, not only is it necessary to provide controls which are responsive to tendency of the voltage to change at the output terminals but, also, it is desirable to provide some means whereby overloads, as manifested by increased load current, are sensed and, as detected, these changes in load current likewise are utilized to reduce the output voltage sufficiently to prevent excessive current flow through components of the equipment.

To this end, I have provided in the lead 25 a resistor 36 which develops an increased voltage proportional to the current flow therethrough. The voltage developed on the resistor 36 operates in conjunction with a resistor 37 in that the forward bias for a transistor 38 having emitter, base and collector electrodes 38a, 38b and 38c, respectively, is a result of the comparison of the voltages across resistors 36 and 37. In order that transistor 38 may be properly biased, the base electrode 38b of transistor 38 is connected to lead 25 while the emitter electrode 38a thereof is connected to a junction point, as at 39, located between the resistor 37 and the resistor 40. In order that transistor 38 may vary the emitter-collector conduction of transistor 35 in response to overload current, the collector 38c is connected to base lead 41 of transistor 35 which lead, as previously explained, is also connected to the collector 31c of transistor 31. Since the conduction of transistor 31 is responsive to output voltage changes across the output terminals 26 and 27 and since the conduction of transistor 38 is responsive to overload current due to a rise in voltage as compared to the output proportional voltage across resistor 37, it will be seen that the effect of these transistors when conducting, upon the base of transistor 35 is to control the conduction from emitter to collector of the transistor 35.

In order that transistor 35 will be properly biased, the emitter electrode 35a thereof is connected to a junction point 42 between resistors 43 and 44 as shown. The resistors 43 and 44 comprise a voltage divider between lead 25 and the junction point 45.

Since the emitter electrode 35a of variable conducting transistor 35 is connected to the junction point 42 on the voltage divider, it is maintained at a suitable potential whereby an operating point for transistor 35 is established.

Thus it will be seen that the variable conducting means, which in the present embodiment is the transistor 35, is common both to output voltage changes as reflected across the voltage divider comprising components 28, 29 and 30 and also to load current changes as reflected by the voltage drop across resistor 36 with respect to the voltage across the resistor 37. To the end that the conducting condition of transistor 35 is impressed upon the transductor 21 to provide the phase relationship between oscillators 10 and 11 as described previously, the conducting condition from emitter to collector of transistor 35 is impressed upon control winding 23. As shown, a curent path for the control winding 23 is provided by means of the leads 46 and 47 which are connected to the respective ends of the coil 23. The lead 46 is connected to the collector electrode 35c of the transistor 35 while the lead 47 from the other end of the winding 23 is connected to the junction point 45.

If the potential on the base electrode 35b of transistor 35 becomes less negative with respect to the emitter electrode due to a change in the conducting condition of either transistor 31 or 38, the conduction of transistor 35 will be reduced thereby reducing the current flow through winding 23. Accordingly, when the output voltage across terminals 26 and 27 changes or when load current rises above a predetermined point whereby the voltage drop across resistor 36 is greater than that across resistor 37, the potential on the base 35b with respect to the positive lead 25 will be changed in the sense that the conduction of transistor 31 and transistor 38 will change in response to output voltage change and overload current respectively. For example, if the output voltage increases slightly, transistor 31 will increase in conduction thereby reducing the current flow through transistor 35 and to winding 23. This reduces the pulse width of the output of power transformer 19 to reduce the output voltage thereby to minimize the increase of voltage at the output terminals.

When the load current increases above a predetermined value so that the voltage drop across resistor 36 is greater than that across resistor 37, transistor 38 will start conducting with the result, again, that the conduction of transistor 35 is reduced to, in turn, reduce the flow of current through control winding 23.

As indicated previously, the voltage drop across the resistor 37 follows the output voltage change. Accordingly, when the voltage drop across resistor 36, by means of transistor 38 dictates a voltage reduction at the output to protect against overload, this voltage reduction is reflected on the resistor 37 with the result that the conduction of transistor 38 is decreased.

With respect to overload control, as has been indicated previously, upon voltage reduction during overload should the current remain constant, the amplitude of the current signal will be increased. Such an increase in amplitude has been found detrimental to circuit components such as transistors. To the end that both voltage and current are reduced during overload conditions, there is provided herein an arrangement including the resistors 36 and 37. These resistors are in series with the emitter-base circuit of transistor 38 and are in bucking relationship to one another. During normal operation, the voltage on resistor 37 dominates that on the resistor 36 whereby the transistor 38 is rendered substantially non-conducting, leaving the transistor 35 to be controlled by the transistor 31 which is responsive to output voltage across terminals 26 and 27. However, the circuit is arranged so that during overload, the output voltage drop will be reflected as decreased voltage drop across resistor 37.

When an overload condition is reached, the transistor 38 immediately operates to take over control of transistor 35 from transistor 31, which had been controlling transistor 35 to regulate the output voltage under normal load conditions. When transistor 38 conducts, thereby reducing the conduction of transistor 35, the output voltage and, therefore, the voltage drop across resistor 37 will decrease.

As load current further increases, output voltage tends to further drop. This is reflected by a lower voltage drop across resistor 37 with the result that less voltage drop across and thus, less current through resistor 36 is required to overcome the effect of resistor 37 upon transistor 38. Consequently upon overload, transistor 38 is rendered conducting by resistor 36 to, in turn, reduce conduction through transistor 35. This condition introduces more lag between companion transistors in the power bridge to reduce the width of pulses applied to output transformer 19. Thus it will be seen that by comparing the voltage drop across resistor 36 to a progressively decreasing voltage drop across resistor 37, both voltage reduction and current reduction are attained as shown by the curve section 50 in FIG. 2 as will be explained presently.

Referring to FIG. 2, which shows the volt-ampere output characteristic of a device utilizing the regulating circuit of the invention, it will be seen that that portion of the curve indicated at 48 shows a substantially constant voltage output during normal operation up to the current overload point represented by the axis 49. When overload is reached, then, through the medium of transistors 38 and 35 and winding 23, an increased delay is introduced into the transductor 21 and thus, between the signals of oscillator 10 and 11. This results in a decrease in the coincidence of conduction between companion transistors in the power bridge which, in turn, causes a voltage drop and a current reduction shown by the portion 50 of the volt-ampere characteristic curve.

From FIG. 1 it will be seen that there is provided for the transductor 21 a bias winding 52 having one end connected to positive ground and the other end connected to negative battery through resistors 53 and 54. This winding 52 is so arranged that there is current flow therethrough at all times whereby it supplies aiding flux to that generated by the winding 23 in the transductor 21. The winding 52 serves as flux delimiting means for delimiting the range of control of the variable control means shown herein as transistor 35.

As indicated previously, it is important that when the operation of the equipment upon overload is in accordance with the section 50 of the curve shown in FIG. 2 that a sensing current exists through the resistor 36 at all times so that when a detrimental condition such as short circuit ceases to exist, this fact is sensed and the device is returned to normal operation as represented by the curve section 48.

As will be seen from FIG. 2, the presence of the winding 52 on the transductor results in a low voltage being maintained during overload operation as represented by the curve section 51. In the event that the detrimental condition is a complete short across terminals 26 and 27 then, of course, the voltage across the equipment reaches zero as shown by curve section 51a. The low voltage maintained under overload conditions by the action of the winding 52 is shown at 51 in the curve of FIG. 2 and is dropped in wire resistances and other components of the unit in the event of short circuit across the output terminals 26 and 27 as shown by curve section 51a.

If desired, a resistor 60 may be placed across the winding 23 to reduce the A.-C. voltage induced thereon from other windings in the transductor.

From the foregoing it will be seen that a unit embodying the regulating circuit comprising this invention has two stages of operation. The first stage is represented by the section 48 of the curve shown in FIG. 2 and may be considered normal operation at which time constant voltage output is maintained by means of the voltage divider comprising components 28, 29 and 30 and its effect, with a tendency in output voltage to change, upon transistor 31, transistor 35 and winding 23.

The second stage, as represented by curve sections 50 and 51, may be defined as overload condition during which period of operation both output voltage and current are reduced by means of resistors 36 and 37, transistors 38 and 35 and winding 23.

All of the variations in operating conditions by means of the components described above result in a controlled change in current flow through winding 23 as aided by current through bias winding 52. The flux change in transductor 21 resulting from current flow in windings 23 and 52 is effective to vary the time delay induced between oscillators 10 and 11 and, in turn, the output of power transformer 19 to rectifier 22 and output terminals 26 and 27.

To the end that the circuit components are adequately protected against detrimental or high inrush current when the unit is turned on, there is provided a novel filter arrangement. The filter comprises a choke 55, a choke 56 and capacitors 57 and 58 connected as shown. The positive ends of capacitors 57 and 58 are connected to the positive lead 25 as at junction 59.

With the foregoing arrangement, it will be seen that all the current delivered to the filter circuit from the rectifier 22 to charge the capacitors 57 and 58 when the unit is first turned on must flow through the overload control resistor 36. As current flows through resistor 36 into the filter circuit and as the voltage across the output terminals 26 and 27 increases from zero, transistor 38 will begin conducting if the filter circuit draws excessive current through resistor 36. This, in turn, will cause a decrease in the conduction of transistor 35 to reduce the output voltage of transformer 19 as explained previously. Thus it will be seen that by the above filter circuit arrangement, components of the unit are protected from excessive peak currents that would normally result from the charging of filter capacitors 57 and 58 when the unit is first turned on. It will be seen that the relative location of resistor 36 and the filter circuit, that is, the location of the resistor 36 between the output and the filter, insures that inrush current will be reflected on resistor 36 to operate the regulating circuit to reduce current flow in coil 23.

It will be understood that the embodiment shown herein is for explanatory purposes and may be changed or modified without departing from the spirit and scope of the invention as set forth in the claims appended hereto.

What is claimed is:

1. In a power supply of the type utilizing pulse width modifying means for varying the duration of pulses from a power circuit to control the output of said power supply, in combination, control means for varying the output pulse width, variable conducting means, means for connecting said control means and variable conducting means in series current conduction relationship, said variable conducting means being responsive to both output voltage and output current, comparison means for comparing an output voltage derived potential to a combined load current and output voltage derived potential, means for connecting said variable conducting means to said control means, in current conducting relationship, means for connecting said comparison means to said variable conducting means to vary the conduction thereof, thereby to vary the flow of current to said control means to vary the pulse width in said power supply through said control means in response to conditions at the output terminals of the power supply.

2. The combination, in a power supply including pulse width modifying means for controlling the output of said power supply and including a plurality of wave generating means with pulse width changing means electrically disposed between said wave generating means to vary the operational relationship thereof; control means for said pulse width changing means, output voltage responsive means, load current responsive means, variable conducting means, means for connecting said output voltage responsive means to said variable conducting means to vary the conduction thereof in accordance with output voltage of the power supply, means for connecting said load current responsive means to said variable conducting means to vary the conduction thereof in accordance with load current and means for operatively connecting said variable conducting means to said pulse width changing means through said control means to vary the operational relationship of said wave generating means in accordance with variation in the output voltage and load current of said power supply.

3. In a power supply of the type adapted to deliver a regulated output voltage under normal load conditions and a reduced output voltage under overload conditions and having a power section adapted to vary the pulse width of an output signal; the combination of output voltage responsive means, load current responsive means, control means, means for operatively connecting said control means to said power section for varying the output of the power supply, variable conducting means connected to said output voltage responsive means and to said load current responsive means, means for connecting said variable conducting means to said control means to vary the current through said control means in accordance with variation in conduction through said variable conducting means, means for connecting said output voltage responsive means to said variable conducting means to vary the conduction thereof in accordance with changes in output voltage and means for connecting said load current responsive means to said variable conducting means to vary the conduction thereof in accordance with changes in load current whereby the operation of the control means is governed by the conduction of said variable conducting means and means connected across the input of said power supply and electrically associated with said control means whereby the output voltage of said power section is prevented from decreasing to zero under overload conditions.

4. In a power supply of the type adapted to supply an output voltage determined by the width of pulses from a power circuit; the combination of output voltage responsive means and load current responsive means, variable conducting means, pulse width changing means, controlling means operatively connected to said pulse width changing means to control pulse width in accordance with current flow through said controlling means, means for connecting said variable conducting means to said controlling means to vary the flow of current through said last named means, means for connecting said output voltage responsive means to said variable conducting means to vary the conduction thereof in accordance with changes in output voltage and means for connecting said load current responsive means to said variable conducting means to vary the conduction thereof in accordance with changes in load current whereby the width of pulses in the power circuit is varied to control pulse width in accordance with current flow through said controlling means to govern the output of said power supply.

5. In a power supply of the type adapted to supply an output voltage having a magnitude determined by the duration of pulses from a power circuit; first variable conducting semi-conductor means, control means for controlling the duration of power pulses in said power circuit, second semi-conductor means responsive to changes in output voltage, third semi-conductor means responsive to changes in load current, means for connecting said second semi-conductor means to said first semi-conductor means in current conducting relationship to control the conduction thereof in accordance with changes in output voltage, means for connecting said third semi-conductor means in current conducting relationship to said first semi-conductor means to control the conduction thereof in accordance with changes in load current, means for connecting said first semi-conductor means in current conducting relationship to said control means to vary the duration of the power pulses in response to the conducting condition of said second and third semi-conductor means and in response to output voltage and load current conditions respectively.

6. In a power supply of the type adapted to supply an output voltage determined by the width of pulses from a power circuit and having output terminals; the combination of pulse width changing means, controlling means operatively associated with said pulse width changing means to vary the width of pulses generated in accordance with current flow through said controlling means, variable conducting means, means for connecting said variable conducting means to said controlling means in current conducting relationship, output voltage responsive means, means for connecting said output voltage responsive means to said variable conducting means to vary the conduction thereof to thereby vary the width of pulses from the power circuit in accordance with the tendency to change of output voltage, a resistor connected serially between the power circuit and one of said output terminals, voltage dropping means having a voltage proportional to the output voltage of the power circuit, means for connecting said resistor to said variable conducting means in power conducting relationship and means for connecting said voltage dropping means between said resistor and said variable conducting means in conduction control relationship whereby an overload greater than a predetermined value causes the variable conducting means to vary in conduction thereby reducing the width of pulses from the power circuit to reduce the output voltage.

7. In a power supply of the type adapted to supply an output voltage determined by the duration of pulses from a power circuit, in combination, output voltage responsive means, load current responsive means, first variable conducting means, pulse width changing means, controlling means operatively associated with said pulse width changing means to control the same to vary pulse width in accordance with current flow through said controlling means, means for connecting said first variable conducting means in current conducting relationship to said controlling means, means for connecting said output voltage responsive means to said first variable conducting means to vary the conduction thereof in accordance with changes in output voltage, second variable conducting means having power electrode means and control electrode means, means for connecting said load current responsive means to said control electrode means to vary the conducting condition of said second variable conducting means in accordance with changes in load current, means for connecting said power electrode means of said second variable conducting means to said first variable conducting means to vary the conduction thereof whereby the duration of pulses in the power circuit is varied to govern the output of said power supply in accordance with the conducting condition of said second variable conducting means as determined by the load current responsive means.

8. In a power supply of the type adapted to supply an output voltage determined by the width of pulses from a power circuit and having output terminals; the combination of pulse width changing means, controlling means operatively associated with said pulse width changing means to vary pulse width in accordance with current flow through said controlling means, variable conducting means, means for connecting said variable conducting means in current conducting relationship to said controlling means, output voltage responsive means to control current flow therethrough, means for connecting said output voltage responsive means to said variable conducting means to vary the conduction thereof to thereby vary the width of pulses from the power circuit in accordance with the tendency to change of output voltage, a resistor connected serially between the power circuit and one of said output terminals to be subject to the current through said terminal, a voltage divider connected across the output of the power circuit, means for connecting said resistor to said variable conducting means and means for connecting a portion of said voltage divider between said resistor and said variable conducting means whereby an overload greater than a predetermined value will cause the variable conducting means to vary conduction thereby changing the width of pulses from the power circuit to change the output voltage and flux delimiting means electrically operatively connecting to said pulse width changing means and connected across the power supply input to prevent the width of the pulses from the power circuit from diminishing to zero under overload conditions.

9. In a pulse producing power supply of the type utilizing a first oscillator and a second oscillator driven thereby for delivering pulses of varying width to vary the magnitude of output of the power supply; the combination of pulse width changing means electrically connected between said first and said second oscillators to produce a variable lag in the operation of said second oscillator, controlling means operatively associated with said pulse width changing means to vary pulse widths in accordance with the flow of current through said controlling means, variable conducting means, means for connecting said variable conducting means in circuit conducting relationship to said controlling means to vary the current therethrough, load current responsive means, means for connecting said load current responsive means to said variable conducting means to vary the conducting condition thereof to thereby vary the width of pulses from the power circuit in response to changes in load current, output voltage responsive means, means for connecting said output voltage responsive means to said variable conducting means to vary the conduction thereof to thereby vary the width of pulses from the power circuit in response to tendency to change of the output voltage, means for delimiting the variable lag in the operation of the said second oscillator whereby the width of the pulses from the power circuit is prevented from diminishing to zero under overload conditions and means for connecting said delimiting means across the input of said power supply in electrical association with said pulse width changing means.

10. In a power supply, in combination, control means, for varying the output of said power supply, variable conducting means, means for connecting said control means to said variable conducting means in current conducting relationship, output voltage responsive means connected to respond electrically to the output voltage of the power supply and connected in conduction varying relationship to said variable conducting means, load current responsive means, means for connecting said load current responsive means to said variable conducting means in conduction varying relationship thereto, and an electrical network connecting said load current responsive means to the output of said power supply, said network including a load current responsive element and an output voltage responsive element arranged to impress a combined load current and output voltage derived potential on said load current responsive means.

References Cited by the Examiner

UNITED STATES PATENTS

| | | | |
|---|---|---|---|
| 2,904,742 | 9/1959 | Chase | 323—22 |
| 2,992,385 | 7/1961 | Lingle. | |
| 3,005,147 | 10/1961 | Thomas. | |
| 3,040,239 | 6/1962 | Walker | 323—24 X |
| 3,026,469 | 3/1962 | Wilbur et al. | |
| 3,173,078 | 3/1965 | Farnsworth | 323—9 |
| 3,207,975 | 9/1965 | Pintell | 323—22 |

JOHN F. COUCH, *Primary Examiner.*

LLOYD McCOLLUM, *Examiner.*

D. L. RAE, K. D. MOORE, *Assistant Examiners.*